July 10, 1973   E. SUNDERMANN ET AL   3,745,201
METHOD OF MANUFACTURING CERAMIC FOAM BODIES
Filed March 19, 1970   5 Sheets-Sheet 2
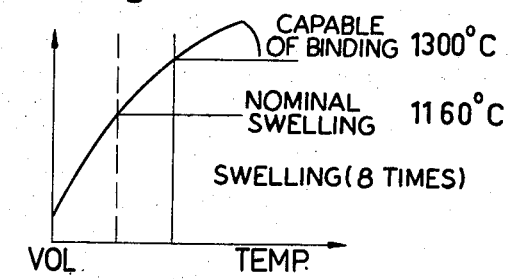
Fig. 2a
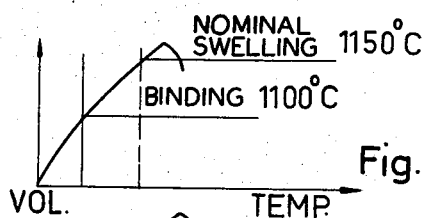
Fig. 2b
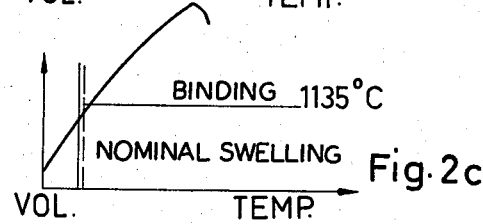
Fig. 2c
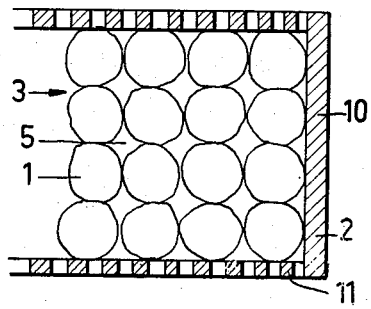
Fig. 4
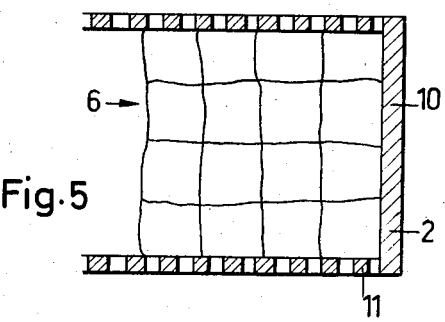
Fig. 5
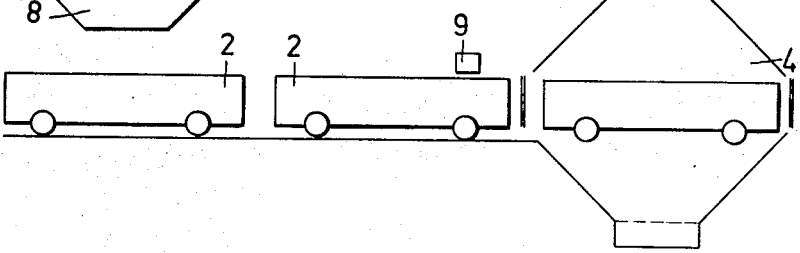
Fig. 6a
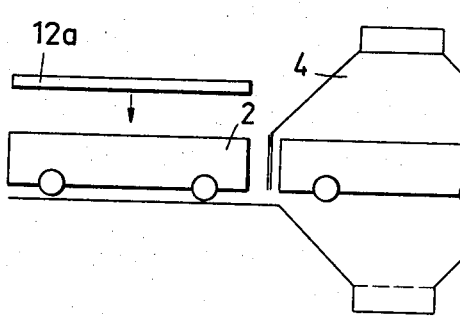
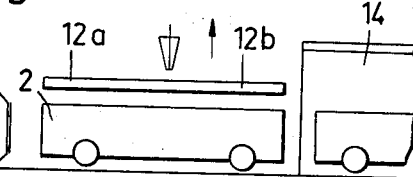
Fig. 6b
Inventors
ERICH SUNDERMANN
JOHANNA VIEDT
BY
ATTORNEY.

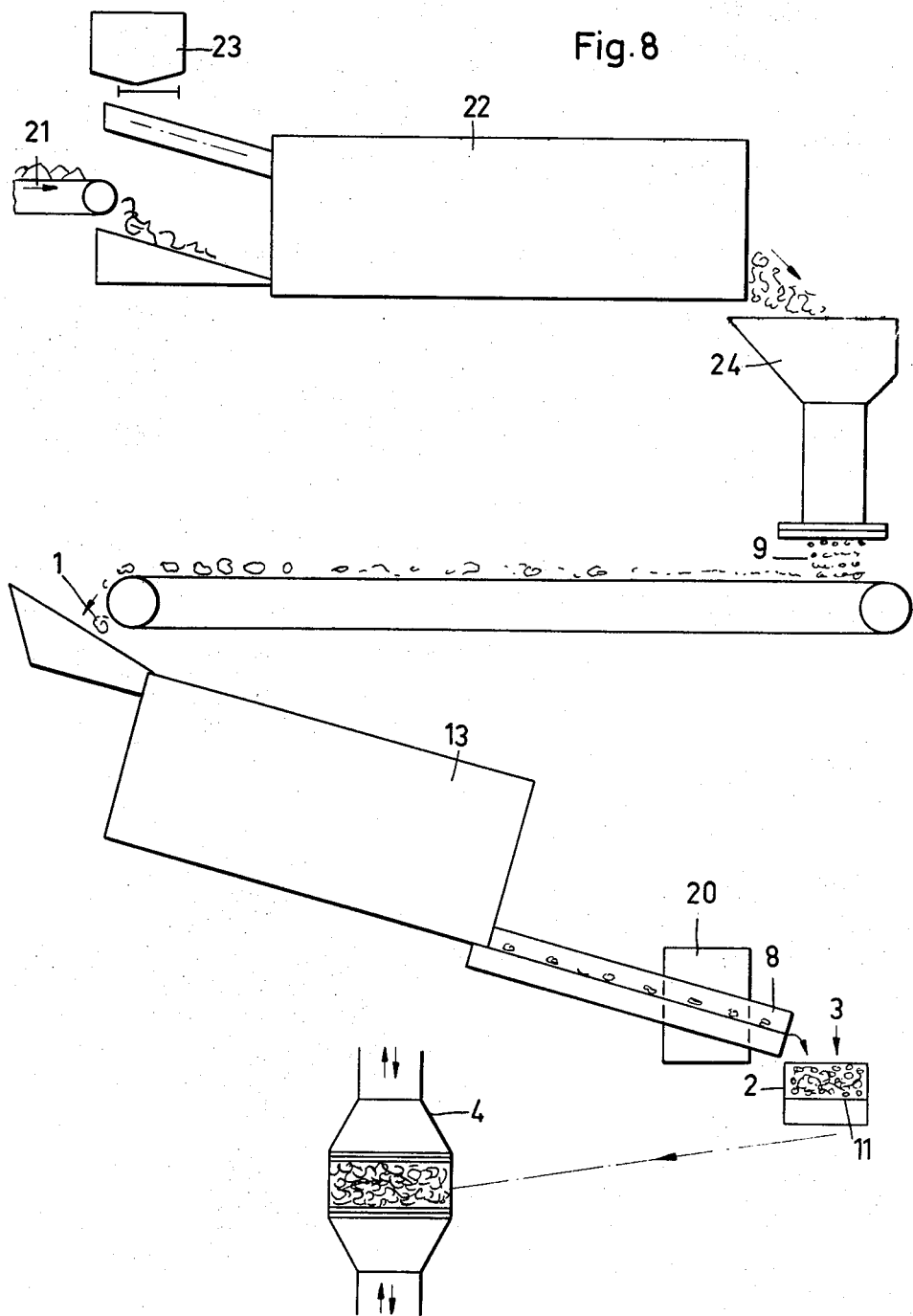

United States Patent Office 3,745,201
Patented July 10, 1973

3,745,201
METHOD OF MANUFACTURING CERAMIC FOAM BODIES
Erich Sundermann and Johanna Viedt, Broitzem, Germany, assignors to Zytan Thermochemische Verfahrenstechnik G.m.b.H. & Co. Kommanditgesellschaft, Braunschweig, Germany
Filed Mar. 19, 1970, Ser. No. 20,916
Claims priority, application Germany, Mar. 21, 1969, P 19 14 372.7; Sept. 10, 1969, P 19 45 811.8, P 19 45 810.7
Int. Cl. B28b *1/50*
U.S. Cl. 264—43                           6 Claims

ABSTRACT OF THE DISCLOSURE

A method of and an apparatus for manufacturing of bodies of swelling clay or equivalent material, which comprise the steps of heating substantially ball-shaped granules formed of treated clay capable of swelling to a plastically binding capacity of their surfaces, then swelling the granules, and deforming the granules to at least partly filling of the gap volume between the granules. Then the granules are bound together by mutual engagement of the surfaces of plastically binding capacity to an integral body. A predetermined quantity of granules of about unitary size are disposed in a heaped body nonyieldingly supported on all sides. Highly heated gas blows alternately controlled from opposite sides for short time periods up to an equal plastically binding capacity of the surfaces of all the granules, and the granules are united due to swelling with simultaneous filling of the gap spaces.

---

The present invention relates to a method for the production of bodies of swelling clays or the like, in which substantially ball-shaped granules, formed of treated clay capable of swelling, are heated, to the state of being capable of plastically binding of the outer-faces, then swelled and deformed up to at least part filling of the gap volume between the granules, as well as the mutual engagement of the surfaces capable of plastically binding to an integral, one-piece body.

The industrial exploitation of minerals capable of swelling, to which belong clays, loams, common clay, brick clay, clay slate and slate clay, is limited at the present time to the production of adding material for light structure elements. In this case the formed, pre-dried granules are swelled in rotary-tube furnaces and baked and thereafter used as adding material for concrete or for others, also as organic binders.

It has been attempted for some time, to drain the granules swelled in the rotary-tube furnace, and thereafter, in their hot state to cause the formation of ceramic binders by means of a pressure treatment. The pressure destroys, however, the swelled structure which is mechanically sensitive in its hot state. There is also no assurance for the formation of ceramic binders since the granules cool off after the drain from the rotary-tube furnace quickly and are mostly already too cool at the start of the pressure treatment, in order to be able still to bind.

It is one object of the present invention to provide a method for manufacturing of bodies of swelling clay or equivalent material, which makes possible the production of ceramically-bound bodies of swelling clay.

It is another object of the present invention to provide a method of manufacturing of bodies of swelling clay, wherein a predetermined quantity of granules of about unitary size is disposed in a heaped body supported nonyieldingly from all sides in a mold, which heaped body is then subjected to a blow of highly heated gas controlled for short time periods alternately from opposite sides, until the surfaces of all granules are equally capable of plastically-binding and unite themselves due to the swelling with simultaneous filling of the gap spaces.

The present invention exploits the following essential recognitions:

The heaped body of granules is permeable to gases and can be heated therefor by flowing gases, whereby by means of a control of the temperature and flow speed nearly any quantities of heat can be transmitted within a short time onto the granules. The granules have a low heat conductivity, however, comparably, a great specific heat, so that at first large heat quantities of energy are stored in the outer scale of the granules and high temperatures are produced, before the heat can propagate into the inside of the ball-bodies of the granules. The outer surfaces are thus overheated and usually capable of being pyraplastical binding plastically, when the size growth caused by the swelling process sets in. It is essential that this size growth alone is sufficient to bring into unison the granule surfaces capable of plastically-binding and to deform the granules in the sense of a filling of the gap spaces. The granules grow thereby, however, without any pressure from the outside into the free-gap spaces.

Industrially exploitable clays contain different iron oxides, and in particular mostly $Fe_2O_3$ and $FeO$. $Fe_2O_3$ influences clays in such manner that the pyroplastic state and the state of being capable of plastically-binding occurs only within the range of higher temperatures, and in particular about 1110° C. and 1135° C., respectively. $FeO$ has the opposite effect and appears to be like a flux.

The present invention exploits this by means of a further development of the new process, which is characterized by the feature, that the granules at first are pre-swelled up to a predetermined volume enlargement disposed below the usable total swelling capacity and are heated then in a further working process after formation of the heaped body and are swelled together, whereby the granules are heated up at the end of the preliminary swelling procedure with oxidizing gas and during swelling together at least timely partly controlled with gases which are poor in oxygen or which are reducing, and in particular to a temperature within the range of about 900° C. to 1100° C., preferably of 1000° C. As an oxidizable heating gas, air may be used. Hot gases from a burner are preferably used for reducing.

The importance of this development of the new method resides in the fact that the swelling process can be influenced in the sense of an exact following of a desired specific weight of the body to be produced, by determining the space weight of the granules after the preliminary swelling and the energy feed during swelling together is adjusted to the required later volume enlargement during the joint swelling. Beyond that, a predetermined space weight can be maintained, thereby, in spite of the changing swelling ability of the granules, by performing during the swelling together, if necessary, a more or less strong volume enlargement of the granules.

The preliminary swelling by heating can be undesirable or can lead to disadvantages, due to the energy expenditure required therefor, as well as due to certain temperature behavior of some clays. For this reason, a further development of the present method resides in the fact that propellants are added to the clay capable of swelling during the treatment and the granules formed of this clay are pre-swelled after their formation from the present propellants in the manner of a foaming process and thereafter heated for the solidification of the foam structure and in particular to about 950° C. up to about 1150° C., for example 1050° C., and that the granules thus pre-swelled are at first pre-heated and thereafter in the heaped body treated for a short time period up to the melting of the outer-faces with preferably reducing heating gases of increased temperature.

The drying procedure requires a time period of about 25 minutes and a time period of about 20 minutes in a rotary-tube furnace to obtain the pyroplastic state.

The apparatus for the performance of the present invention resides in accordance with the present invention in the fact, that a passage chamber is provided for the guidance of gases greatly heated in a burner, as well as for the reception of the heaped bodies to be heated with these gases, whereby the heaped body is received in a rather rollable form box with massive side walls and sieve-like perforated bottom, as well as selectively a perforated cover usable in the passage chamber, perforated cover or a massive cover usable outside the passage chamber.

With these and other objects in view, which will become apparent in the following detailed description, the present invention, which is disclosed by example only, will be clearly understood in connection with the accompanying drawings, in which:

FIGS. 1a, b and c disclose the three essential embodiments of the method used in the apparatus of the present invention in a block scheme;

FIGS. 2a, b and c depict volume-temperature diagrams of different clays during swelling and binding;

FIG. 4 is a part-sectional view of the non-yieldingly supported heaped body consisting of granules, prior to the heat treatment;

FIG. 5 is a part-sectional view, similar to that of FIG. 4, of the heaped body after the heat treatment;

Figure 7A:
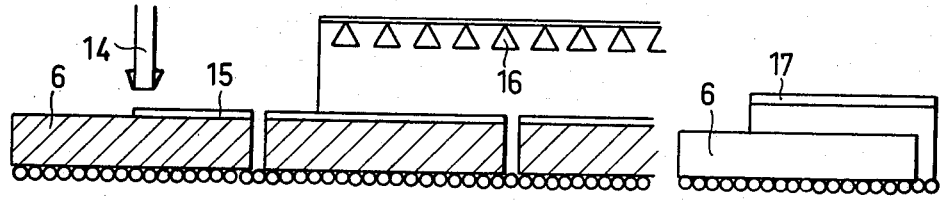
Figure 9:
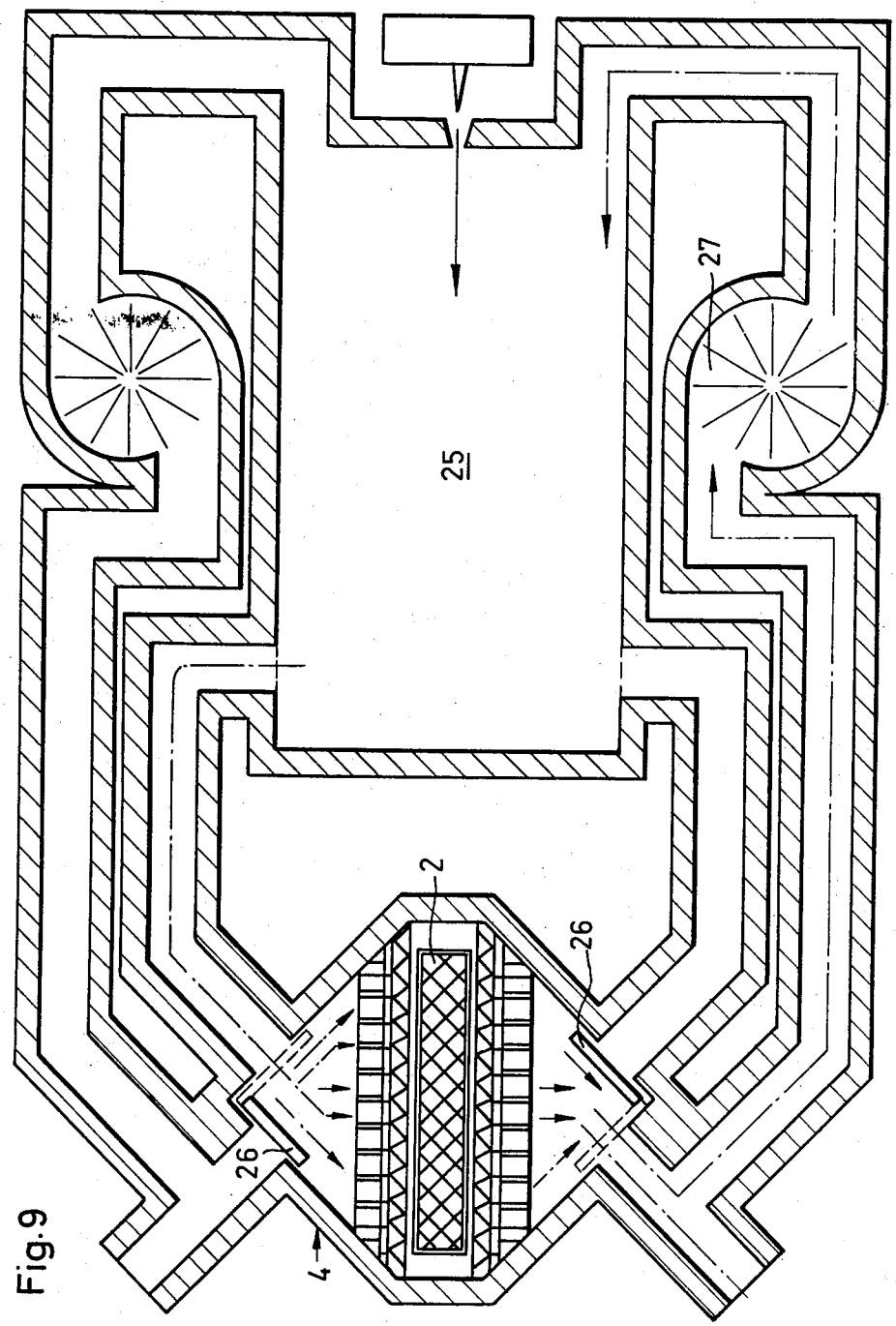

FIGS. 6a and b are schematic elevations of the structure of an apparatus for the performance of the method of the present invention;

FIGS. 7a, b and c are schematic elevations of further embodiments of the apparatus, indicating details of the after treatment of the swelled and bound bodies;

FIG. 8 is a schematic elevation of still another embodiment of the apparatus designed in accordance with the present invention, indicating the details of the devices, which are required prior to the swelling together of the granules; and FIG. 9 discloses a sectional view of a possible embodiment of a passage chamber for the heat treatment of the heaped bodies.

Figure 1A:
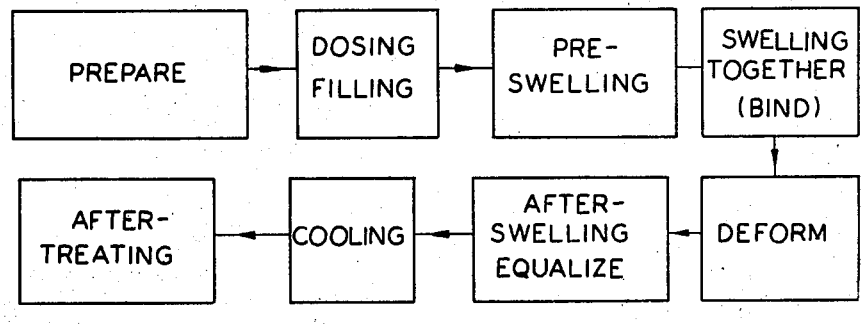

Referring now to the drawings, for the production of ceramically-bound bodies of swelling clay, in accordance with FIG. 1a, suitable starting material, for example clay capable of swelling, loams, common clay, brick clay, clay slate and slate clay, is prepared and worked to granules 1, which are of about ball shape. After drying and sifting, the granules 1 of unitary size are dosed in a molding box 2 as a heaped body 3 and introduced for a heat treatment into a passage chamber 4. Since large gap spaces 5 are present between the granules 1, the heaped body 3 is permeable to gases and can be heated by blowing through of highly heated gases.

The blowing through has the advantage, that also thick heaped bodies 3 can be heated quickly and relatively equally up to and into the core of the heaped body. Furthermore, during the blowing through large quantities of heat at a temperature range of 900 to 1100° C., preferably 1000° C. depending upon the used material, as is known per se can be transmitted within a short time, if the work is performed with correspondingly high flow speeds and temperatures. Heating procedures, which would extend normally over time periods of the order of one or a plurality of hours, can be shortened by blowing through to the time period of a few minutes and a few seconds, respectively.

During the blowing, the volume of the granules 1 can be increased depending upon the swelling capacity of the clay to a multiple of the starting volume. The non-swelled granules 1 do not fill out therefore the molding box 2, since the latter has the measurements of the body to be produced. For this reason, the granules 1 are at first pre-swelled, until they fill out without loss of the ball-shaped, the molding box 2 (FIG. 4). They are maintained thereby in movement, in order to avoid the blocking, through which the gap spaces 5 can be clogged up between the granules 1. Clogged up and closed gap spaces 5, respectively, would render impossible a further blowing through.

During the following swelling together, the granules 1 are heated to about a temperature of 1135° C. such, that the faces thereof, become capable of plastically-binding. The simultaneously progressive volume enlargement of the granules 1 cannot cause a volume enlargement of the heaped body 3, because the molding box 2 is filled up and its walls do not yield. Accordingly, the granules 1 are deformed. They swell into the gap spaces 5 and fill up the latter depending upon the heat fed thereto, or upon the swelling capacity completely or partly. Simultaneously, the surfaces of the granules 1 grow towards each other. Since they are capable of plastically-binding, they melt. An integral body 6 (FIG. 5) is created, which is rolled out from the passage chamber 4 and is subjected to after treatment.

Figure 3:
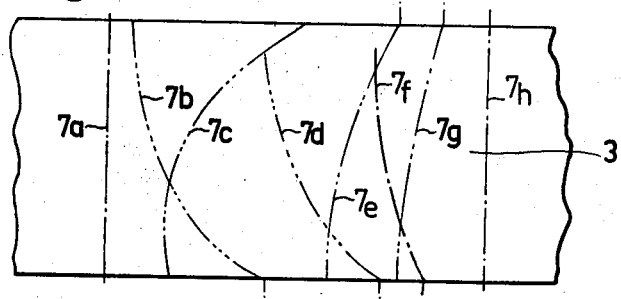
FIG. 3 is a schematic temperature diagram of a heaped body after multiple blowing through with hot gases.

FIG. 3 shows a heaped body 3 with indicated temperature profiles 7a–7h. At the start of the blowing through of highly heated gases, a unitary temperature 7a prevails at all points of the heaped body.

For the after treatment, a predetermined time period without extreme cooling is provided, which is instituted prior to, or after the deformation, in order to make possible later swelling procedures, etc., and to balance out temperature.

A cooling as well as an after treatment of proper type follows this equalization or the deformation, by which cooling and after treatment, for example a surface of the body 6 can be mechanically roughened.

The above-described method assumes, that the used clay at about the same temperature range is capable of binding in which also the desired volume increases has taken place (see diagram FIG. 2c). This is in the practice an exceptional case. The natural swelling and sintering occurrence of industrially used clays renders more difficult in many instances the maintenance of a predetermined space weight as shown in the diagrams in FIGS. 2a and 2b. The diagram in FIG. 2a shows the case in which the particular clay becomes capable of binding only at a temperature, at which the swelling has progressed up to the double of the desired volume. The diagram in FIG. 2b shows the opposite case, the clay becomes capable of binding, before the desired volume enlargement takes place.

An essential point of view of the present invention resides in the fact that the blowing through of the heaped body 3 takes place in accordance with requirements controlled with oxygen-poor or even reducing gases or with oxidizing gases. By this arrangement also in the situations disclosed in FIGS. 2a and 2b the desired bodies can be produced.

The more or less large content of iron oxides, present in all industrially usable clays is a presumption therefor. These iron oxides are present normally as $Fe_2O_3$ as well as FeO. $Fe_2O_3$ displaces the range in which a clay becomes capable of plastically binding in the direction towards higher temperatures, FeO operates, however, as an addition in the sense of a lowering of this temperature range. The quantity ratio, in which both iron oxides stand relative to each other, influence the pyroceramic behavior of a clay.

If granules 1 are heated with oxidizing gases, then $Fe_2O_3$ surpasses, while with reducing gases FeO dominates, and the similarly as an addition operating $Fe_3O_4$ can be found. If in the practice the desired volume enlargement is obtained, the state of capability of binding occurs, however, only at higher temperatures (FIG. 2a), then it is necessary to set the desired swelling value by application gases, in order to reach the stage, which is shown in FIG. 2c. In the example shown in FIG. 2b, the capability of binding has to be at first prevented up to the point of reaching the desired volume enlargement by heating with oxidizing gas.

In the practice, a pre-swelling takes place with an oxidizing gas at least for some time periods. During swelling together by an oxidizing gas at first care can be taken, that the gap spaces 5 are maintained long enough, in order to transmit sufficient energy. Only at the end of the blowing together, at least for a short time period, heating takes place with reducing gas, whereby the granules 1 immediately melt.

Figure 1B:
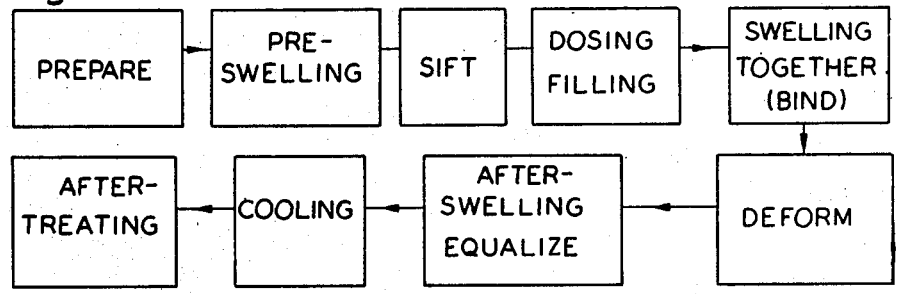

By the pre-swelling with oxidizing gas relatively stable, pre-swelled granules 1 are created mechanically, which can be sifted and transported, without causing any damage to the swelling structure. For this reason, the pre-swelling in accordance with FIG. 1b can be performed timely, as well as spaciously separate. The heaped body 3 is formed only then, when the granules 1 are pre-swelled, whereby the dosing takes place in dependency from the space weight of the pre-swelled granules and in dependency of the desired space weight of the body 6. The after treatment body 6 takes place in the same manner as in the method according to FIG. 1a.

If by the application of reducing or oxidizing heating gases alone, in accordance with the requirements, the state in accordance with FIG. 2c cannot be set, then the granules can be surrounded with suitable layers. In the situation shown in FIG. 2a, the layer must consist of a clay or the like, which is capable of binding at correspondingly lower temperatures.

The swelling of clay, etc. rests mostly on organic particles in the clay, which particles deliver during the heating gaseous combustion products or also disintegration products. Clays which cannot swell naturally or only to an insufficient extent, can be made capable of swelling by suitable additions as for example diesel oil.

Figure 1C:
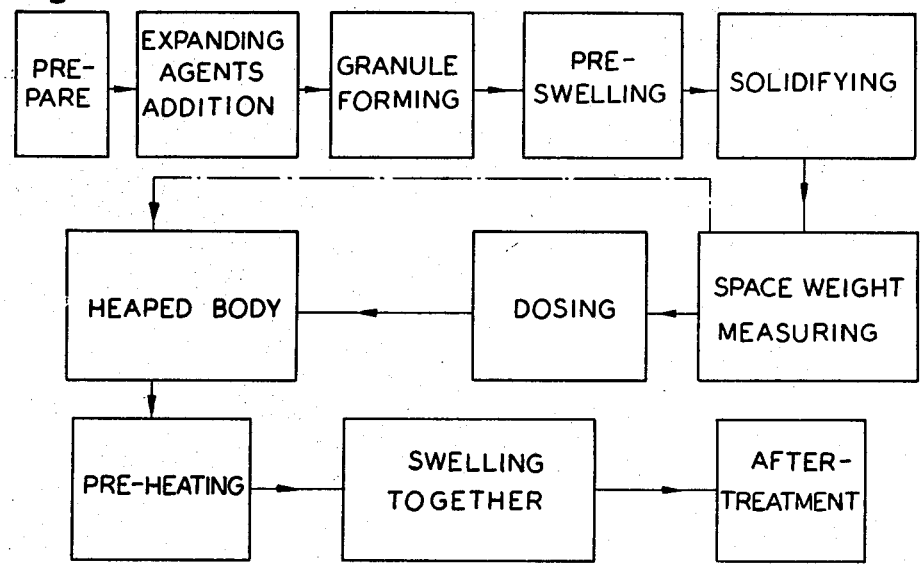

The method in accordance with FIG. 1c is applied, to clays, with a natural swelling capability, if a thermal swelling is to be circumvented. This method is characterized by the fact, that additions are provided during the preparation. Suitable additions are calcium carbide, calcium hydride, sulphate of aluminum, as well as hydrogen peroxide-solution which produce jointly with water gases, by which the clay foams after formation of the granules without heat treatment. The point-dotted line in FIG. 1c indicates, that the addition takes place in dosages, whereby the results of space weight measurements are used as reference values.

The mechanically sensitive foam structure of the granules 1 pre-swelled by additions is solidified, by drying and burning the granules. The solidified granules 1 are subjected to dosaging either prior to or after the pre-heating within a time period of 20 to 25 minutes, which takes place in a rotary-tube furnace, if such furnace is used. The pre-heating takes place, without producing an extensive inner pressure of the additions contained in the pores of the foam structure, which could tear up the pore walls and could destroy the foam structure. An oxidizing gas feed supports this procedure. Upon termination of the solidification, after dosing and filling of the granulates into the burner forms heating takes place within the shortest possible time suddenly, under circumstances with reducing gases, up to the setting of the state of the capacity of plastically-binding. Thereby, simultaneously a thermally caused swelling of the granules 1 occurs which makes possible the swelling together to the body 6.

After a first blowing through which occurs observing FIG. 3 from the bottom to the top, the temperature profile 7b is obtained. The temperature profile 7c results, if then the blowing occurs from the top to the bottom. By continuous change of direction of the heating gases, the temperature profiles 7b, 7c–7g flattened out slowly always more, until they approach the profile 7h. This procedure occurs with very thick heaped bodies 3 or then, when between the temperature curve 7a and the curve 7h, a comparatively large temperature distance is present. If this is not the case, also exclusively from one side can be blown through.

The method of the present invention can be performed continuously or stepwise. Thus, in accordance with FIG. 6a, molding boxes 2 can be continuously filled from a dosing device. For this purpose, either dried, preferably, however, pre-swelled granules 1 are used. Before the molding boxes 2 with the heaped bodies reach the passage chamber 4, a planning device 9 takes care, that the heaped body 3 has a plain smooth surface.

The molding boxes have massive side walls 10 (FIGS. 4 and 5), however, a gas permeable, for example a grate-like bottom 11. The molding box 2 can be closed in upper direction either with a permeable, grate-like cover 12a, or a massive cover 12b. The cover 12a is required, if the covering is performed prior to rolling in to the passage chamber 4 or in the latter. In case of short tact time periods, the heat inertia of the granules is exploited and the cover 12b is applied after emerging from the passage chamber 4 (FIG. 6b).

FIGS. 6a and 6b show only a single passage chamber 4. Practically, however, a plurality of passage chambers 4 is used, which depending upon the requirements, for example is disposed parallel relative to each other and for the reception of very large molding boxes 2 can be combined or can perform exclusively special functions, as the pre-heating, the blowing together, etc. For the pre-heating, solidification or thermal pre-swelling, rotary tube furnaces 13 can be used instead of the passage chambers 4 (FIG. 8).

Figure 7B:
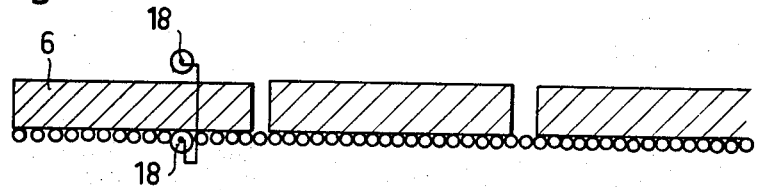
Figure 7C:
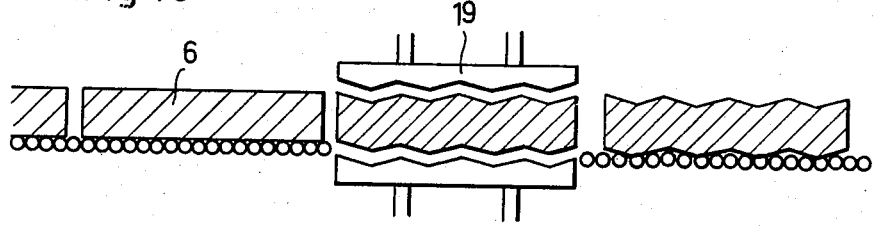

FIGS. 7a to 7c show examples for the after treatment of the bodies 6 after the deformation. From a feeding device 14, it is possible to apply a layer 15, for example a glazing layer and the layer can be burned either by the heat of the body 6, which heat is still present, or under the effect of burners 16. For the cooling serves a cooling tunnel 17 (FIG. 7a).

The body 6 can be smoothed between rollers 18 or also equipped with a design (FIG. 7c). The smoothing or designing of the surfaces of the bodies 6 can also be performed by presses 19. By this arrangement, the bodies 6 can obtain particular front faces on one side.

FIG. 8 shows a scheme of the apparatus for the method of the present invention. The previously mentioned rotary-tube furnace 13 serves either for the solidification or for the thermal pre-swelling of the granules 1. The filling of the molding boxes 2 with pre-swelled granules 1 takes place by means of the dosage device already indicated in connection with FIG. 6a, which dosage device, however, has coordinated thereto a measuring device 20 for the determination of the space weight.

FIG. 8 shows a molding box 2 with movable bottom 11. By such arrangement, bodies 6 can be produced with unitary molding boxes, which bodies 6 have different thicknesses or a different space weight.

In accordance with FIG. 8, clay 21 is fed into a preparation device 22 and with the provision of additions prepared by means of a dosing device 23. An extruder 24 works the prepared clay into granules 1, which foam under the influence of the additions, that means they are pre-swelled and are fed to the rotary-tube furnace 13 for solidification. If the material is thermally pre-swelled, the dosage device 23 can be omitted. Instead of an extruder 24 other granulating devices are used which release the granules produced therein, either directly, or after passage of a drying device in the rotary-tube furnaces.

FIG. 9 shows how a passage chamber 4 can be supplied from a burner 25 with highly heated gases. Controlled dampers 26 serve for the determination of the direction of flow. A flow circuit prevails, which is supported by a blower 27.

Deviating from this presentation, burners can also be structurally connected directly with passage chambers or can also be built in. Devices can be used thereby in order to drive the heating gases pulse-like or explosion-like through the heaped body 3. During the blowing through, by gas feeding and by the structure of the passage chamber and of the burner, respectively, care must be taken that an equalized heating takes place.

In order to prevent, that the highly heated clay adheres to the walls of the molding boxes 2, suitable layers can be used of the molding box surfaces. By cooling of the molding box walls, such that they remain closely below the critical temperature, the adherence can also be prevented.

While we have disclosed several embodiments of the present invention, it is to be understood that these embodiments are given by example only and not in a limiting sense.

We claim:

1. A method of manufacturing ceramic foam bodies, as light structure plates, from pre-swelled granulates made from a clay containing iron oxides at least at its surfaces, comprising the steps of
    introducing pre-swelled clay-granulates of substantially uniform size and in form of at least one gas-previous layer into a perforated mold,
    swelling said clay-granulates within said mold by blowing an oxidizing heated gas through said layer alternately in opposite directions,
    the temperature of said oxidizing heated gas being below a temperature which makes the surface of said clay-granulates pyroplastic, and
    blowing a reducing heated gas through said layer alternately in opposite directions to pyroplastically engage and bind the contacting surfaces of said clay-granulates.

2. The method, as set forth in claim 1, which includes the step of
    applying to said clay-granulates at least one outer layer of a clay, which become pyroplastic at a temperature, higher than the swelling temperature, when heated by said reducing heated gas.

3. The method, as set forth in claim 1, which includes the steps of
    adding swelling agents, before forming said clay-granulates, to said clay-granulates, capable of being swelled,
    pre-swelling said granulates formed of said clay after its foaming by means of said swelling agents,
    said swelling including heating said clay for solidification of the latter,
    preheating said pre-swelled and solidified granules for swelling together in said body with heated oxidizing gases, and then
    applying for a short time period reducing heated gases of increased temperature up to a melting together of the surfaces of said granulates.

4. The method, as set forth in claim 1, which includes the step of
    providing a layer of a glazing mass at least on one surface of said ceramically bound body, and
    sintering said glazing mass by the latent heat of the body before cooling.

5. The method, as set forth in claim 1, which includes the step of
    mechanically smoothing at least one surface of said ceramically bound body, and
    pressing said one surface.

6. The method, as set forth in claim 1, which includes the step of
    applying a design to at least one surface of said ceramically bound body.

References Cited

UNITED STATES PATENTS

| | | | |
|---|---|---|---|
| 1,842,801 | 1/1932 | Rodgers et al. | 264—44 |
| 2,910,760 | 11/1959 | Jackson | 264—62 X |
| 2,946,112 | 7/1960 | Tucker et al. | 264—62 UX |
| 3,046,607 | 7/1962 | Blaha | 264—43 UX |
| 3,076,248 | 2/1963 | Darrow et al. | 264—56 X |
| 3,230,283 | 1/1966 | Hughes | 264—62 |
| 3,240,850 | 3/1966 | Hess | 264—125 |
| 3,249,662 | 5/1966 | Gie et al. | 264—57 |
| 3,274,309 | 9/1966 | Schreieck | 264—42 |
| 3,288,615 | 11/1966 | Estes et al. | 264—44 X |
| 3,328,187 | 6/1967 | Ban | 264—43 UX |

FOREIGN PATENTS

| | | | |
|---|---|---|---|
| 53,160 | 10/1933 | Norway | 264—44 |
| 280,567 | 2/1929 | Great Britain | 264—42 |

PHILIP E. ANDERSON, Primary Examiner

U.S. Cl. X.R.

106—40 R; 264—65